(12) United States Patent
Hielscher et al.

(10) Patent No.: US 9,505,062 B2
(45) Date of Patent: Nov. 29, 2016

(54) METHOD AND DEVICE FOR PRODUCING A VIBRATING MOTION OF A MASS

(75) Inventors: Holger Hielscher, Teltow (DE); Harald Hielscher, Stahnsdorf (DE); Thomas Hielscher, Stahnsdorf (DE)

(73) Assignee: DEVAD GmbH, Teltow (DE)

( * ) Notice: Subject to any disclaimer, the term of this patent is extended or adjusted under 35 U.S.C. 154(b) by 497 days.

(21) Appl. No.: 13/979,149

(22) PCT Filed: Jan. 9, 2012

(86) PCT No.: PCT/EP2012/050230
§ 371 (c)(1),
(2), (4) Date: Jul. 11, 2013

(87) PCT Pub. No.: WO2012/095385
PCT Pub. Date: Jul. 19, 2012

(65) Prior Publication Data
US 2013/0284474 A1 Oct. 31, 2013

(30) Foreign Application Priority Data
Jan. 11, 2011 (DE) .................. 10 2011 008 576

(51) Int. Cl.
*B23B 47/00* (2006.01)
*B06B 3/00* (2006.01)
*B23B 29/12* (2006.01)

(52) U.S. Cl.
CPC .............. *B23B 47/00* (2013.01); *B06B 3/00* (2013.01); *B23B 29/125* (2013.01); *B23B 2270/10* (2013.01)

(58) Field of Classification Search
CPC .......... B23B 2260/108; B23B 29/125; B23B 37/00; B23B 2270/10; B23B 47/00; B06B 3/02; B06B 1/0618; B06B 1/06
USPC .......................................... 173/1; 310/323.19
See application file for complete search history.

(56) References Cited

U.S. PATENT DOCUMENTS 3,396,892 A * 8/1968 Balamuth ................. B06B 1/00
228/1.1
4,856,391 A 8/1989 Mishiro
(Continued)

FOREIGN PATENT DOCUMENTS

DE 2352678 4/1975
DE 3813176 12/1988
(Continued)

OTHER PUBLICATIONS

Examination Report Dated Jan. 23, 2015 From the German Patent and Trademark Office Re. Application No. 102011008576.9.
(Continued)

*Primary Examiner* — Michelle Lopez

(57) ABSTRACT

The invention relates to a method and device for producing an oscillatory motion of a mass, in particular of a tool, wherein the mass is mechanically connected to at least two clamping elements between said clamping elements in the direction of oscillation propagation and the mass (50) is clamped in by the two clamping elements (10, 20) under the application of pressing force (F), and at least the clamping elements are designed as components of a resonance system, and an excitation oscillation is introduced into the resonance system, the frequency of the excitation oscillation substantially corresponding to the resonance frequency of the resonance system so that the resonance system oscillates. The invention further relates to a method for processing solid or liquid material while using the method according to the invention in order to produce an oscillatory motion of a mass.

11 Claims, 3 Drawing Sheets

(56) References Cited

U.S. PATENT DOCUMENTS

| | | |
|---|---|---|
| 6,109,502 A | 8/2000 | Sato |
| 7,002,283 B2 | 2/2006 | Li et al. |
| 2004/0245893 A1 | 12/2004 | Li et al. |
| 2007/0193757 A1* | 8/2007 | Bar-Cohen ........... B25D 11/064 173/90 |

FOREIGN PATENT DOCUMENTS

| | | |
|---|---|---|
| DE | 102005063230 | 7/2007 |
| FR | 1354322 | 1/1964 |
| JP | 58-165902 | 10/1983 |
| JP | 61-236401 | 10/1986 |
| JP | 2004-363612 | 12/2004 |
| WO | WO 2010/145927 | 12/2010 |

OTHER PUBLICATIONS

Decision of Rejection Dated Sep. 7, 2015 From the Japanese Patent Office Re. Application No. 2013-548807.

* cited by examiner

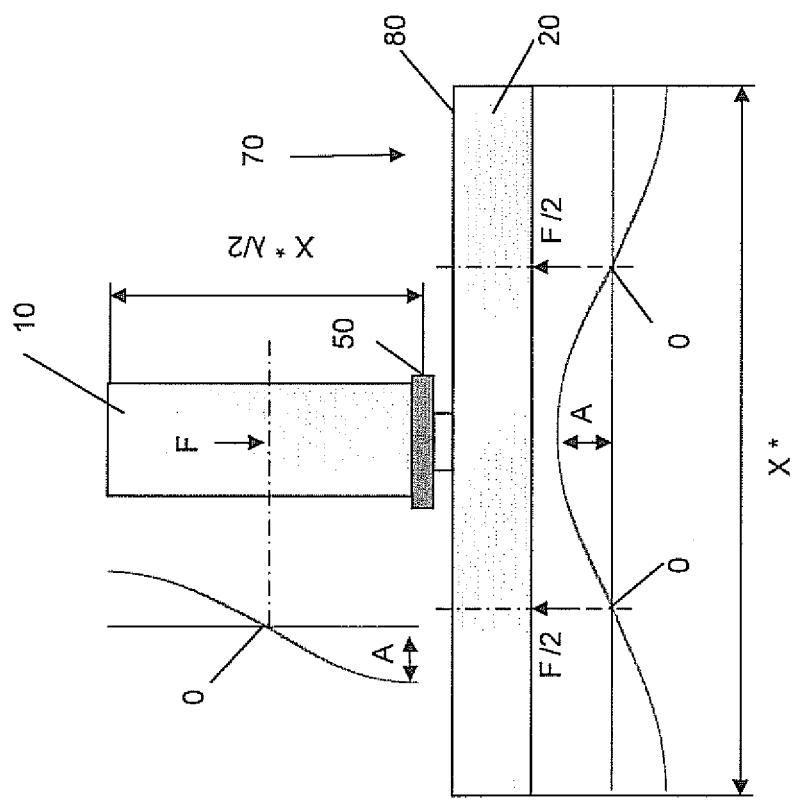
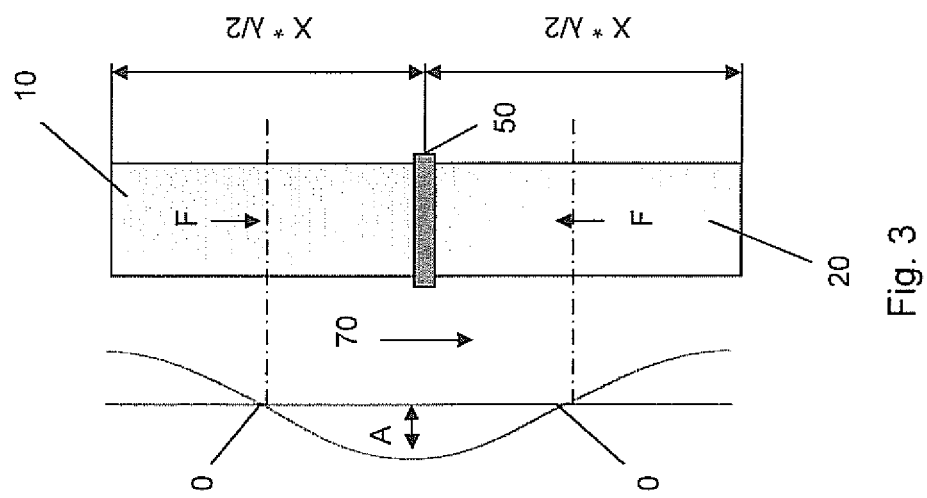
Fig. 4
Fig. 3

METHOD AND DEVICE FOR PRODUCING A VIBRATING MOTION OF A MASS

RELATED APPLICATIONS

This application is a National Phase of PCT Patent Application No. PCT/EP2012/050230 having International filing date of Jan. 9, 2012, which claims the benefit of priority of German Patent Application No. 10 2011 008 576.9 filed on Jan. 11, 2011. The contents of the above applications are all incorporated by reference as if fully set forth herein in their entirety.

FIELD AND BACKGROUND OF THE INVENTION

The present invention relates to a method and a device for producing an oscillatory motion of a mass, in particular of a tool.

Generating mechanical movements of solid masses through excitation with excitation oscillations, such as ultrasound, is known in the art.

DE 100 27 264 C5 discloses an ultrasound transducer with an oscillating body that can be excited by ultrasound is arranged between masses formed as clamping elements. The resonance of the oscillating body causes oscillations between the masses.

SUMMARY OF THE INVENTION

It is also known to attach masses to or on a resonator, wherein the resonator is subjected to an excitation oscillation, causing the resonator to perform natural oscillations, whereby oscillations are also excited in the attached mass. The additional mass can be attached to the resonator with a screw or a clamping element that is tensioned with a screw. Other attachment options include soldering the mass or welding, gluing, or positive seating by shrinking of and/or compression.

When such structures are moved at the resonance frequency of the resonator, acceleration forces are produced as a function of the resonance frequency and the oscillation amplitude, as well as a function of the weight of the respective masses. The fastening means in form of a screw, clamps or the positive-locking seating material has to absorb the inertia forces. Depending on the respective direction of movement of the mass, tensile stresses are produced in the fastening means that can cause material fatigue in particular for a prolonged duration of the oscillation and at high frequencies. Such material fatigue may lead to plastic deformation and/or may cause the fastening means to break.

In other words, the size or weight of the mass to be accelerated and/or its frequency and amplitude are limited in particular by the tensile stresses prevailing in the fastening means.

It is therefore the object of the present invention to provide a method and a device for generating an oscillatory motion of a relatively heavy mass at a high frequency and/or a large amplitude in a cost effective and simple manner.

This object is attained by the method for producing an oscillatory motion of a mass according to claim 1 and by the device for generating an oscillatory motion of a mass according to claim 4. Advantageous embodiments of the method of the invention are recited in the dependent claims 2 and 3. Advantageous embodiments of the device of the invention are recited in the dependent claims 5 to 7. In addition, a method for machining a workpiece by using the method of the invention for generating an oscillatory motion according to claim 8 provided. An advantageous embodiment of the method for machining a workpiece is recited in the dependent claim 9.

According to the invention, a method for generating an oscillatory motion of a mass, in particular of a tool, is provided wherein the mass is arranged between at least two clamping elements in the oscillation propagating direction and is mechanically connected to the at least two clamping elements, and the mass is clamped between the two clamping elements by a pressing force produced by the two clamping elements, and wherein at least the clamping elements are designed as part of a resonance system, and an excitation oscillation is introduced in the resonance system at a frequency that substantially coincides with the resonance frequency of the resonance system, thereby causing the resonance system to oscillate. The oscillation is hereby preferably a standing wave having a defined propagation direction. The mass is arranged and clamped between the clamping elements in the propagation direction of the oscillation. Preferably, the excitation frequency should completely match the resonance frequency. However, deviations between the excitation frequency and the resonance frequency are allowed in practice, wherein the excitation frequency fs may be in the range of $fs=0.8*fr \ldots 1.2*fr$, wherein fr defines the resonance frequency.

The resonance frequency is essentially the same as the respective natural frequency as long as the system lacks damping. By providing a permanent excitation, minor damping effects are negligible, for example damping due to mechanical contact between the oscillating mass and an additional object. However, when damping having a significant effect on the oscillation of the mass is actually present, the damping factor must be included in the calculation of the respective resonance frequency for determining the resonance frequency.

Due to the mechanical connection of the mass to the clamping elements, the mass oscillates in a resonant situation of the clamping elements with the same frequency and amplitude. The two matched clamping elements having an approximately identical resonance frequency thus form at least partially the resonance system.

In a particularly advantageous embodiment of the method of the invention, the mass is entrained in the oscillation of the clamping elements due to the positioning and clamping of the mass between the clamping elements, wherein the mass is shifted by a pressure force applied by one of the clamping elements in the direction of the other clamping element. This means that the mass is displaced for a positive oscillation amplitude from a first clamping element, which may be arranged, for example, closer to the oscillation generator than a second clamping element, in the direction of the second clamping element and is moved back during the reverse oscillation-driven translational movement and hence negative amplitude from the second clamping element towards the first clamping element.

Thus, no pulling forces occur on the mass and/or on one of the clamping elements, but only pressure forces acting on the mass. A skilled person is well aware that the permissible compressive stresses of most solid materials are substantially higher than the permissible tensile stresses. Permissible tensile or compressive stresses refer to those stresses that a body made of the respective solid material can withstand without undergoing plastic deformation.

The greatest forces acting on a mass during an oscillation of a mass at a relatively high frequency and large amplitude are the inertial forces which depend on the size (and weight)

of the mass and its acceleration. The greater the permissible stresses are, the greater can be the permissible forces be that act on the mass. When the mass is constant, a greater acceleration of the mass can be set. This means that the mass can oscillate at a greater frequency and/or with larger amplitude during an oscillation than with conventional mass oscillations. According to the invention, a larger mass can be accelerated using a conventional frequency or amplitude, or conversely, a conventional material can be accelerated at a higher frequency and with a larger amplitude. This allows new processing technologies and/or shortened processing times when using oscillation-based technologies.

In one embodiment of the method according to the invention, the resonance system may be formed by the clamping elements, so that only the clamping elements are excited by the excitation oscillation. This means that the frequency of the introduced excitation oscillation corresponds to the resonance frequency of the resonance system formed of the clamping elements. In this embodiment, the mass retained between the clamping elements is not part of the resonance system and is therefore not excited directly by the excitation oscillation. This may be realized, for example, when the natural frequency of the mass is different from the excitation frequency. The mass may advantageously be formed as a tool. That is, the mass formed as a tool and placed between the clamping elements is caused to oscillate, whereby the oscillatory motion of the tool can be utilized in a processing operation. The mass is thus not part of a device which generates the oscillation for performing the method.

In an alternative embodiment, the resonance system may be formed by the clamping elements and the mass, so that the clamping elements and the mass are excited by the excitation oscillation. That is, in this embodiment, the introduced frequency of the excitation oscillation corresponds to the resonance frequency of the resonance system formed by the clamping elements and the mass. The mass is hereby excited by the excitation frequency in the same manner as the clamping elements.

According to the invention, a device for generating an oscillatory motion of a mass is also provided which includes the mass, which may be in particular a tool, and further includes a resonance system with which the mass can be accelerated. The device includes an oscillation generator for generating an excitation oscillation having a frequency that substantially matches the resonance frequency of the resonance system. According to the invention, at least two clamping elements are part of the resonance system, wherein the mass is mechanically connected with the clamping elements so as to be fixed between the clamping elements by a pressing force applied by the two clamping elements. In other words, the mass is fixed between the clamping elements when a longitudinal oscillation is applied in an oscillation propagation direction. The device according to the invention is utilized in particular for carrying out the inventive method. As indicated above, the resonance system may be formed exclusively by the clamping elements, or the resonance system may be formed by the clamping element in conjunction with the mass. The oscillation generator is preferably an ultrasound transducer, so that the excitation oscillations are ultrasound oscillations.

The mass may be clamped so that a pressing force is applied by the two clamping elements. This embodiment is used in particular for carrying out the invention, when the resonance system is formed by the clamping elements and the mass. The clamping elements and the mass oscillate synchronously with the pressing force as a resonance system, thereby eliminating the risk that one of the clamping elements separates from the mass. Therefore, there is no need to arrange a device transmitting a mechanical pulling force between the clamping elements.

If necessary, the non-positive attachment of the mass may be combined with a positive attachment of the mass. The pressing force is hereby preferably introduced into the clamping elements at a virtually oscillation-free location of the clamping elements, for example at a node, where the oscillation amplitude has a zero-crossing. Preferably, both clamping elements are clamped at the zero crossings.

In one embodiment of the device according to the invention, a mechanical connection may be provided between the clamping elements for transmitting a pulling force between the clamping elements. This mechanical connection may extend through or bridge the mass disposed between the clamping elements. The mass and the mechanical connection between the clamping elements are arranged in parallel in the propagation direction of the oscillation. The mechanical connection is preferably a screw connection, i.e. a mechanical connection capable of optionally also exerting a pressing force on the mass. This pressing force produces a non-positive attachment of the mass in addition to the positive attachment. The mechanical connection and hence also the mass are preferably located at a maximum, i.e. at a point of the respective maximum oscillation amplitude of the two clamping elements. This embodiment may be realized in both embodiments, i.e. when the resonance system is formed exclusively by the clamping elements, or when the resonance system is formed by the clamping elements and the mass. The stresses caused by the dynamic stresses of the mechanical connection are kept low due to the synchronous movement of the clamping elements at resonance.

In a simple embodiment of the device according to the invention, both clamping elements may be designed as translational resonator. Consequently, both clamping elements are subjected to pressure and buckling due to clamping of the mass. Preferably, the two clamping elements are therefore interconnected with a clamping sleeve, wherein the clamping sleeve introduces pressing forces into the clamping elements at those locations were the oscillation has the aforementioned zero-crossings.

Alternatively, the pressing forces may also be applied hydraulically or pneumatically.

In an alternative embodiment of the device, at least one of the clamping elements may be designed as a flexural resonator. The device according to the invention is in this embodiment an oscillating system composed of a translational resonator and a flexural resonator.

The invention further provides a method for processing solid or liquid matter by utilizing the method of the invention for producing an oscillatory motion of a mass, wherein the mass is formed as a tool that performs with its oscillatory motion a machining operation on the matter. This method is preferably performed using the device of the invention. The oscillatory motion of the tool is converted into a movement of an element performing work, such as a cutting edge for machining, a laser for cutting, welding or heating purposes or a cleaning element. However, a preferred application relates to machining of a workpiece. Such machining of a workpiece may be, for example, ultrasound-assisted external turning, internal turning, cutting with a circular knife, sawing with a circular saw, milling with a milling cutter or a honing process. With the invention, adhesion of material to be cut on the cutting edge is prevented during cutting. During sawing, a sawing gap can be realized with a width that is greater than the width of the saw blade, thereby preventing the saw blade from jamming even when the saw teeth are not interlaced. Alternatively, the method of the invention can be used for exciting masses to treat fluids with cavitation.

In the method for machining a workpiece according to the invention, the mass is preferably formed as a turning tool that cuts a rotating workpiece, wherein the rotation speed of the workpiece $v_c$ is less than the velocity $v_s$ of the translational movement of the cutting tool caused by the oscillation. That is, the preferred application of the method according to the invention is turning a workpiece, wherein the term turning tool refers to all cutting elements that can be used for turning operations, for example also indexable inserts. When using ultrasound as an excitation oscillation, the translational oscillatory velocity $v_s$ of the turning tool can thus be adjusted to be greater than the rotation speed of the workpiece $v_c$ at the point of engagement of the cutting edge of the turning tool. When using ultrasound, the rotational speed $v_c$ must be selected to be smaller than the velocity of sound.

In other words, a translational velocity (velocity of sound $v_s$) of the insert tip must be greater than the peripheral speed ($v_c$) of the rotating workpiece in order to interrupt the cutting process.

The following applies:
$v_s$=Sound velocity [m/s]
$v_c$=Peripheral speed [m/s]=cutting speed
with the following relationships:

$$v_c = \pi * d * n$$

with
d=workpiece diameter [m]
n=rotation speed [1/s]
and $$v_s = A*\omega = A*2*\pi*f$$

with
$\omega$=angular frequency [1/s]
A=mathematical amplitude [m]
f=frequency [1/s, Hz].

According to the invention, so-called ultrasound-assisted turning can thus be achieved, which allows as a hybrid method the simultaneous coupling of an additional form of energy in the form of an oscillation into the effective zone the machining process. This allows meeting an increased number of the requirements of modern production technology, such as a reduction of friction and of cutting forces due to lower elastic and plastic deformation of the machining system, resulting in higher production accuracy and a reduction of tool wear. In particular, the chip formation and the cutting interruption can be specifically influenced, for example to prevent random chips. Such random chips represent health risks or hazard potentials for the operators and/or the production facilities. The device and method according to the invention can be employed to intentionally prevent random chips, particularly when processing materials having a tendency for forming random chips. The production run can then be automated, resulting in chips having a relatively low volume. The invention also reduces heating of the cutting tool, thereby increasing the tool life and eliminating waiting times in additional manual processing. Furthermore, specifically the surface structure can be influenced when implementing the method. A higher productivity can then be achieved with the same or higher precision of the workpieces. Overall, the invention offers the advantage of improving the machinability and overcoming technical limitations, coupled with an increase in performance.

BRIEF DESCRIPTION OF THE DRAWINGS

The present invention will now be described with reference to the exemplary embodiments depicted in the appended drawings, wherein FIG. 3 shows a schematic diagram of the method according to the present invention based on translational resonators, FIG. 4 shows an alternative embodiment of the method according to the present invention based on a system of a translational resonator and a flexural resonator.

DESCRIPTION OF SPECIFIC EMBODIMENTS OF THE INVENTION

Figure 1:
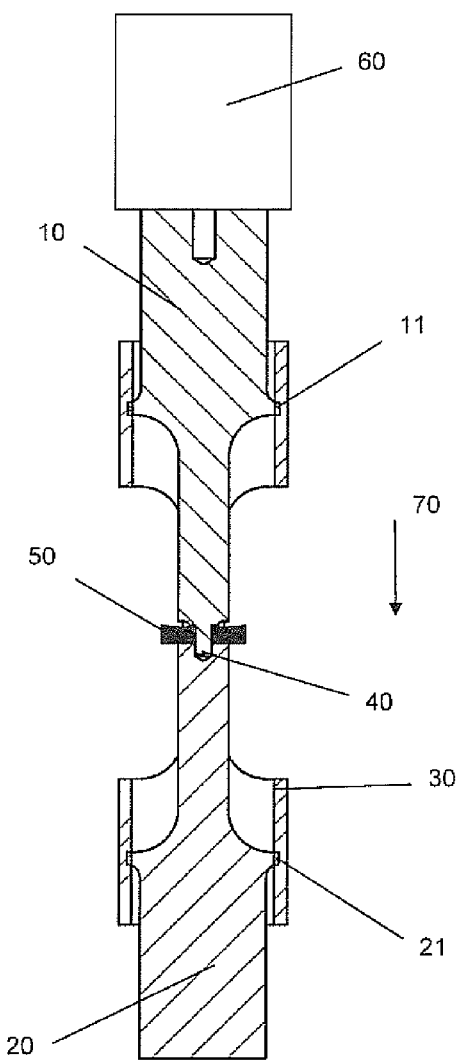
FIG. 1 shows a sectional view A-A of a device according to the present invention.
Figure 2:
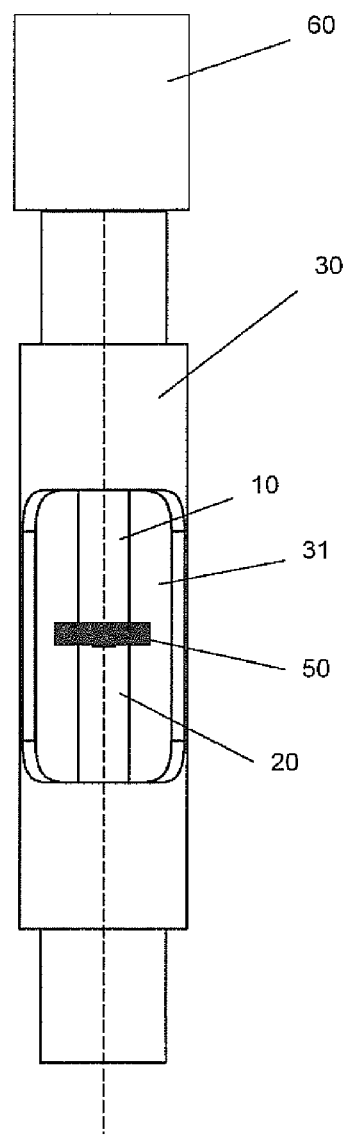
FIG. 2 shows a device according to the present invention in a side view.

FIG. 1 shows in a section A-A a device of the present invention for producing an oscillatory motion of a mass 50, wherein the sectional profile is shown in FIG. 2. The device comprises a first clamping element 10 and a second clamping element 20, wherein the mass 50 is clamped between the clamping elements 10 and 20. The mass 50 can be constructed, for example, as a tool, as will be described below. For implementing a non-positive support of the mass 50, a mechanical connection 40 projecting from the first clamping element 10 in the second clamping element 20 is arranged between the clamping elements 10, 20. The mechanical connection 40 can be designed, for example, as a screw connection. In this way, the mechanical connection 40 produces not only a positive attachment of the mass 50, but also a non-positive attachment. The two clamping elements 10, 20 are mechanically connected to each other by a clamping sleeve 30, as seen in particular in FIG. 2. The clamping sleeve 30 mechanically engages with a first thread-step 11 on the first clamping element 10 and with a second thread-step 21 on the second clamping element 20. The clamping elements 10, 20 are thus mechanically connected to one another via the clamping sleeve 30 independent of the mechanical connection 40. Due to the attachment on the thread-steps 11, 21, a pressing force can be applied to the clamping elements 10, 20 by rotating the clamping sleeve 30, so that opposing pressure forces are applied to the mass 50 between the clamping elements 10, 20. An oscillation generator 60, for example, an ultrasound transducer, is disposed on the first clamping element 10. The oscillation generator 60 generates, for example, a standing longitudinal wave. Because at least the first clamping element 10 and the second clamping element 20 are configured as a resonance system, these clamping elements 10, 20 oscillate longitudinally in the direction of an oscillation propagation direction 70 when excited with an excitation frequency matching the resonance frequency of the resonance system. This causes an oscillatory motion of the mass 50.

As already described above, the resonance system which is excited by the excitation oscillation may be formed by only the clamping elements 10, 20, or may be formed by the clamping elements 10, 20 in conjunction with the mass 50. In the embodiment where the resonance system is formed by only the clamping elements 10, 20, the mass 50 is carried along by one of the clamping elements 10, 20 only by an applied pressure force acting on the mass 50 and thus performs an oscillation. In the embodiment, where the mass 50 is a part of the resonance system, the clamping elements 10, 20 as well as the mass 50 are excited, so that they oscillate synchronously.

As shown in FIG. 2, the mechanical connection 40 is not limited to the embodiment shown in FIG. 1, but the mass 50 may also be provided with a shaped element that is positively and/or non-positively connected with at least one of clamping elements 10 and 20. The clamping sleeve 30 has preferably the opening 31 shown in FIG. 2 to enable transmission of the oscillatory motion of the mass 50 to the workpiece arranged adjacent to the device.

FIGS. 3 and 4 show the clamping elements 10, 20 with the mass 50, wherein the waveform is displayed in addition to the clamping elements 10, 20 to illustrate the process.

As can be seen in FIG. 3, pressing forces F are applied to two resonant clamping elements 10, 20, so that the mass 50 arranged between the clamping elements 10, 20 is subjected to these forces F. In other words, a compressive load acts on the oscillating materials. The locations where the pressing forces F are introduced into the clamping bodies 10, 20 correspond to zero-crossings or oscillation nodes 0 having the waveform illustrated on the side.

This means in relation to FIG. 1, that the locations where the pressing forces F are introduced are the position of the first thread-step 11 and the position of the second thread-step 21, i.e. they coincide with the zero-crossings or oscillation nodes 0. As can be seen, the mass 50 is in the region of the amplitude A. Thus, when an oscillation, such as ultrasound, is introduced into the resonance system, the clamping locations, namely the thread-steps 11 and 21, are not substantially subjected to oscillations, whereas the region where the mass 50 is clamped oscillates at resonance in the direction of oscillation propagation direction 70. It is also evident that the locations where the pressing forces are introduced are arranged at the center of a respective half-wavelength λ, wherein x represents an integer number of wavelengths.

Even when the clamping elements 10, 20 are connected by a mechanical connection 40, the oscillating components are not subjected to a tensile load. A tensile load may be eliminated with a mechanical connection 40 in that a pressing force is generated by the mechanical linkage 40 and/or by the clamping sleeve 30 which can be set to be greater than the respective inertia of the body to be accelerated. In other words, the permissible compressive or buckling stresses only define the technical limits. As previously mentioned, the permissible compressive stresses are for most materials significantly higher than the permissible tensile stresses. Consequently, heavier masses and/or masses may be accelerated at a higher frequency and/or a greater amplitude than would be possible with conventional methods and devices. The processing parameters can hence be substantially increased, thereby also increasing the productivity.

In addition to mechanical clamping of the clamping elements 10, 20 with the clamping sleeve 30, other possibilities for applying the pressing forces F to the clamping elements 10, 20 may alternatively be implemented, for example application of hydraulic or pneumatic pressure.

The influence of the mass 50 on the resonance frequency must be taken into account and optionally be compensated by geometric adaptations of the resonance system. Such adaptation may include, for example, reducing the thickness of one or both clamping elements 10, 20 by the thickness of the mass 50, such that the mass 50 is also a part of one or both clamping elements 10, 20 and thus also a part of the resonance system. In other words, parts of the mass may arithmetically transition into the mass of the clamping elements, depending on the pressing force, thereby reducing the mass m to be accelerated.

The pressing force must always be greater than the acceleration force in order to avoid slack coupling of the mass 50. The following calculation shows the technical variables that can be optimized according to the invention. The aim is: $F_b < F_a$ with $F_a$=pressing force [N]
$F_b$=acceleration force [N].

The acceleration force $F_b$ is calculated as:

$$F_b = m*A$$

with m=mass [kg]
a=acceleration [m/s²].

Here, the following relationship exists:

$$a = r*\omega = A*(2*\pi*f)^2$$

with r=radius [m]
ω=angular frequency [1/s]
A=mathematical amplitude [m]
f=frequency [1/s, Hz])

This results in:

$$F_b = m*A*(2*\pi*f)^2$$

After $F_a$ has been determined from the permissible stress, the possible attainable amplitude is then:

$$A = \frac{F_a}{m*(2*\pi*f)^2}$$

The maximum frequency can be determined from the illustrated mathematical relationship after transformation into the frequency domain.

Feasible amplitudes are, for example, in the range of 30-50 μm, preferably 40 μm, at a frequency of 20-30 kHz, in particular at 26 kHz.

FIG. 4 shows a device according to the invention, wherein the first clamping element 10 is constructed as a translational resonator and the second clamping element 20 is constructed as a flexural resonator 80, meaning that the first clamping element 10 performs a longitudinal oscillation and the second clamping element 20 performs a transverse oscillation. As can be seen from the waveform relating to the oscillation of the second clamping element 20, the pressing forces F are also applied with the flexural resonator 80 at the respective zero-crossings and oscillation nodes 0. As a result, the mass 50 performs the same translational oscillation as in an exclusively translational oscillation system of FIG. 3.

Figure 5:
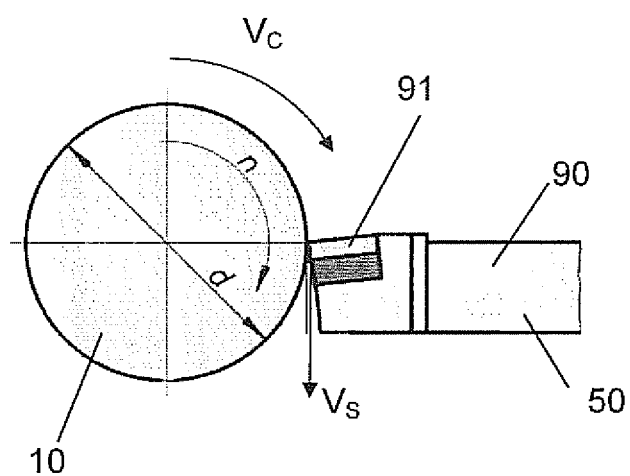
FIG. 5 shows a diagram of a turning process.

FIG. 5 shows a preferred application of the method and the device according to the invention, in which the mass 50 is embodied as a tool 90 in form of a turning tool. The cutting edge 91 of the turning tool is in engagement with a rotating workpiece 100. The periphery of the workpiece 100 is rotating at a rotation speed $v_c$. Substantially no relative movement occurs in a definite time period between the cutting edge 91 and the periphery of the workpiece 100 due to the oscillatory motion of the turning tool 90 with a tool speed $v_s$ in particular for an excursion in the direction of the tool speed $v_s$, as shown in FIG. 5. When the translational movement of the tool 90 is reversed, a relative movement occurs at a speed that corresponds to the sum of the rotation speed $v_c$ and the tool velocity $v_s$. This prevents the formation of a random chip or a flow chip and generates a relatively short chip. This form of chip has advantageously a smaller enveloping volume, thus requiring less transport capacity for the removal of the chips. In addition, due to the only temporarily and permanently interrupted cut, heat-up of the tool 90 is minor, thus increasing its service life.

Relatively large forces acting on the tool 90 can be set because only pressing forces are applied to the tool 90. Since inertia forces represent the largest forces acting on the tool 90 during an oscillation, the tool 90 can have a correspondingly large mass and/or can be moved at a correspondingly high frequency and large amplitude A. This allows the use of an ultrasound transducer as an oscillation generator 60, which permits tool velocities $v_s$ at the velocity of sound. The rotation speed $v_c$ of the workpiece 100 which depends on the speed and on the diameter d of the workpiece 100 can be adjusted to be commensurately high. This in turn makes it possible to move at very high cutting speeds, to set a relatively high feed rate and to machine relatively large workpieces 100.

The invention claimed is:

1. A method for producing an oscillatory motion of a mass, comprising:
    arranging the mass between at least two clamping elements and mechanically connecting the mass with the at least two clamping elements in an oscillation propagating direction, wherein at least the clamping elements form part of a resonance system,
    applying with the at least two clamping elements a pressing force to the mass for clamping the mass, and
    introducing an excitation oscillation in the resonance system with a frequency that substantially matches a resonance frequency of the resonance system, causing the resonance system to oscillate, wherein the oscillation is a standing wave,
    wherein the locations where the pressing forces are introduced into the at least two clamping elements correspond to zero-crossings or oscillation nodes.

2. The method of claim 1, wherein the mass comprises a tool.

3. The method of claim 2, for machining solid or liquid matter with the oscillatory motion of the tool.

4. The method of claim 3, wherein a rotating workpiece made of solid matter is machined and wherein the tool is constructed as a turning tool cutting the workpiece, with a rotation speed of the workpiece being smaller than a velocity of a translational movement of the turning tool produced by the oscillatory motion.

5. The method of claim 1, wherein the resonance system is formed entirely by the at least two clamping elements, so that only the at least two clamping elements are excited by the excitation oscillation.

6. The method of claim 1, wherein the resonance system is formed by the at least two clamping elements and the mass, so that the clamping elements and the mass are excited by the excitation oscillation.

7. A device for generating an oscillatory motion of a mass, comprising:
    a mass,
    a resonance system having at least two clamping elements and configured to accelerate the mass, and
    an oscillation generator configured to generate an excitation oscillation as a standing wave, wherein a frequency of the excitation oscillation substantially matches a resonance frequency of the resonance system,
    wherein the mass is mechanically connected between the at least two clamping elements through application of a pressing force,
    wherein locations where the pressing forces are introduced into the at least two clamping elements correspond to zero-crossings or oscillation nodes.

8. The device of claim 7, wherein the mass comprises a tool.

9. The device of claim 7, wherein the at least two clamping elements are connected by a mechanical connection configured to transmit a pulling force between the at least two clamping elements.

10. The device of claim 7, wherein the at least two clamping elements are constructed as translational resonators.

11. The device of claim 7, wherein at least one of the at least two clamping elements is constructed as a flexural transducer.

* * * * *